Figures 1, 2, 3:
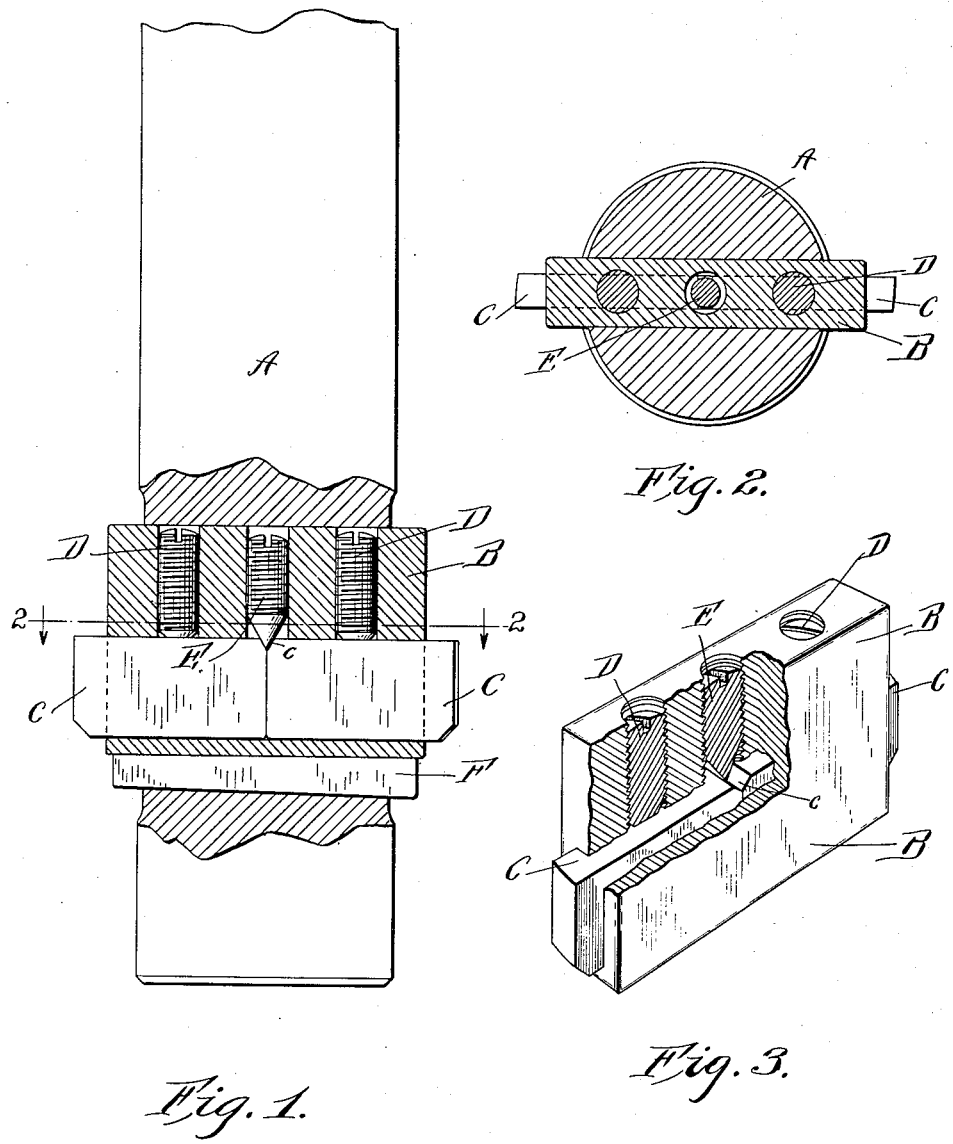

B. D. FORD.
ADJUSTABLE CUTTER.
APPLICATION FILED NOV. 8, 1915.

1,218,992.

Patented Mar. 13, 1917.

Inventor,
Bion D. Ford,
By Hull, Smith, Brock, & West,
Att'ys.

UNITED STATES PATENT OFFICE.

BION D. FORD, OF CLEVELAND, OHIO.

ADJUSTABLE CUTTER.

1,218,992.   Specification of Letters Patent.   Patented Mar. 13, 1917.

Application filed November 8, 1915. Serial No. 60,195.

*To all whom it may concern:*

Be it known that I, BION D. FORD, a citizen of the United States, residing at Cleveland, in the county of Cuyahoga and State of Ohio, have invented a certain new and useful Improvement in Adjustable Cutters, of which the following is a full, clear, and exact description, reference being had to the accompanying drawings.

This invention relates to cutters for metal working and especially to cutters of the expansion type provided with inserted blades which are adjustable angularly to vary the diameter of the cutter. The tool is particularly adapted for reaming and milling operations.

The principal object of the invention is to provide improved means for supporting and adjusting the cutting blades in the cutter bar, the device comprising a body which is held in the cutter bar, and a pair of radially adjustable blades in the body, which blades may be set out by means of a cone screw operating between the inner ends thereof.

The construction is such that the adjustment may be easily effected by slipping the body out of the cutter bar and manipulating the adjusting and binding screws to bring the cutter to the desired size.

A further object of the invention is to provide a self-contained cutter head (said head comprising the aforesaid body and the blades) wherein the blades may be adjusted to any desired position to compensate for wear, etc., and may be clamped in such adjusted position and the head be capable of convenient insertion into and removal from the slot provided therefor in the cutter bar or shank.

In the accompanying drawings Figure 1 is a longitudinal section of a cutter containing the invention. Fig. 2 is a section on the line 2—2 of Fig. 1. Fig. 3 is a perspective view of the cutter head comprising the body and the blades therein.

In the drawings, A is a cutter bar or shank having a diametrical cross slot to receive the non-circular cutter body or holder B. This body has a close fit in the slot at the sides and one end, and is removably held therein by a wedge key F driven between the body and the lower or other end of the slot.

The lower part of the body or holder B is slotted through, lengthwise thereof, or crosswise of the tool axis, to receive the blades C, a pair of which are used, the outer ends being properly backed off or otherwise shaped to give a desired cutting edge, and the upper inner end corners of the blades are beveled as indicated at c to receive the conical point of the adjusting screw E which is tapped through the upper part of the block B. The blades are held at adjustment by binding screws D also tapped through the upper part of the block. The screws are sunken into the block to permit proper contact of the upper edge of the block with the wall of the upper end of the slot in the bar A.

It is obvious that by loosening the binding screws D and advancing the screw E the blades may be adjusted radially outwardly to the desired position, to take up wear or to suit the work to be done, and they are held as set by the binding screws D. The head may be quickly removed from the bar, for the purpose of adjusting the blades, by knocking out the wedge F. By holding the tools in a holder or body which itself is removable from the cutter bar, a self-contained cutter head is provided which is capable of being secured within the cutter bar or shank by merely inserting the head in the slot thereof and wedging it in place, the countersunk clamping and adjusting screws permitting this action. Furthermore, it is possible to substitute different heads for cutters of different designs or dimensions, no change of the cutter bar being required. And, also, cutters of different profile can be substituted in the same holder or body. A particular advantage of the construction is the simplicity of the parts, and an absence of special features requiring extended or particular milling or drilling operations found in other cutting tools of the expansion type.

Having thus described my invention, what I claim is:—

1. A self-contained cutter head comprising a holder body having a slot extending longitudinally therethrough and adapted to be inserted into and clamped within the slot of a cutter bar or shank, the said body being widened or thickened at one side of said slot, a pair of radially movable blades in said slot, said blades having their adjacent end corners beveled, a countersunk adjusting screw in the thickened portion of said body and having a conical point adapted to be interposed between said beveled corners, and a countersunk clamping screw for each of said blades also mounted in the widened or thickened portion of said body.

2. A self-contained cutter head adapted to be inserted into and clamped within the slot of a cutter bar or head, said head comprising a holder body having a slot extending longitudinally therethrough, a pair of radially movable blades within the slot in said body, a countersunk adjusting screw tapped into said holder and having a conical point interposed between the opposed ends of said blades, and a clamping screw for each blade also countersunk in said body.

3. A self-contained cutter head comprising a holder body having a slot extending therethrough and adapted to be inserted into and clamped within the slot of a cutter bar or shank, said body having a relatively thick wall extending from one side of its slot, a pair of blades longitudinally movable in the last mentioned slot, an adjusting screw in the thickened wall of said body and having a conical point adapted to be interposed between the proximate ends of said blades, and a clamping screw for each of said blades also mounted in the thickened wall of said body and adapted by their adjustment to engage and clamp the blades in the positions in which they may be adjusted by the first-mentioned screw.

4. A self-contained cutter head adapted to be inserted into and clamped within the slot of a cutter bar or head, said head comprising a unitary holder body having a slot extending therethrough, a pair of blades adjustable lengthwise of the slot in said body, an adjusting device interposed between the proximate ends of said blades and countersunk within said body and adapted to move the blades longitudinally of the slot therein, and a clamping screw for each of said blades adapted each to engage a blade and also countersunk in said body.

In testimony whereof, I hereunto affix my signature.

BION D. FORD.